United States Patent [19]

Church et al.

[11] Patent Number: 4,825,197

[45] Date of Patent: Apr. 25, 1989

[54] DUAL STATUS MAGNETIC MARKER HAVING MAGNETICALLY BIASABLE FLUX COLLECTORS FOR US IN ELECTRONIC ARTICLE SURVEILLANCE SYSTEMS

[75] Inventors: Russell W. Church, Oakdale; Eugene C. Heltemes, White Bear Lake, both of Minn.

[73] Assignee: Minnesota Mining and Manufacturing Company, St. Paul, Minn.

[21] Appl. No.: 151,063

[22] Filed: Feb. 1, 1988

[51] Int. Cl.$^4$ .............................................. G01B 13/18

[52] U.S. Cl. ..................................... 340/572; 340/551

[58] Field of Search ................ 340/551, 572; 343/787, 343/832; 455/107

[56] References Cited

U.S. PATENT DOCUMENTS

| | | | |
|---|---|---|---|
| 3,665,449 | 5/1972 | Elder et al. | 340/280 |
| 3,747,086 | 7/1973 | Peterson | 340/280 |
| 3,790,945 | 2/1974 | Fearon | 340/280 |
| 4,075,618 | 2/1978 | Montean | 340/280 |
| 4,660,025 | 4/1987 | Humphrey | 340/551 X |
| 4,710,754 | 12/1987 | Montean | 340/572 |
| 4,746,908 | 5/1988 | Montean | 340/551 |

FOREIGN PATENT DOCUMENTS

| | | | |
|---|---|---|---|
| 763681 | 11/1933 | France | 12/2 |

*Primary Examiner*—Jerry W. Myracle

*Attorney, Agent, or Firm*—Donald M. Sell; Walter N. Kirn; William B. Barte

[57] ABSTRACT

A dual status marker for use in electronic article surveillance systems having an alternating magnetic field. The marker comprises a magnetic responder element having a central switching portion and flux collectors on each end which concentrate flux within the switching portion to ensure that the flux density therein is sufficient to generate an approximate response. The marker is made dual status by providing magnetizable keeper elements adjacent the flux collectors. When the keeper elements are magnetized, the associated field biases the flux collectors and inhibits magnetization reversal therein in response to an interrogation field, thereby preventing flux from the interrogation field from being concentrated in the switching portion of the responder element.

13 Claims, 2 Drawing Sheets

DUAL STATUS MAGNETIC MARKER HAVING MAGNETICALLY BIASABLE FLUX COLLECTORS FOR US IN ELECTRONIC ARTICLE SURVEILLANCE SYSTEMS

FIELD OF THE INVENTION

This invention relates to electronic article surveillance (EAS) systems and dual status markers used therein, and in particular, to such markers in which a piece of magnetic material utilized in the marker is interrogated by an alternating magnetic field and produces, when in a sensitized state, harmonics of the field which may be detected to indicate the presence of the marker, and which when in a desensitized state, produces an altered response.

BACKGROUND OF THE INVENTION

It is now well known to utilize a piece of low coercive force, high permeability magnetic material as the responder material in a harmonic generating EAS marker. Such markers were perhaps first disclosed in the French Patent No. 763,681, issued in 1934 to Pierre Arthur Picard. More recently, it has become relatively well known to use particularly configured pieces, such as elongated strips of high permeability material, as set forth in U.S. Pat. Nos. 3,665,449, 3,790,945 and 3,747,086. It is also known from the latter disclosures to provide dual status markers by including at least one piece of a permanently magnetizable material adjacent to the piece of high permeability material. When such additional pieces are magnetized, an external magnetic field is present which biases the high permeability responder material, thereby altering the response of the marker in an alternating interrogation field.

While still recognizing that an elongated, or "open-strip" configuration is desired in order to obtain a very high order harmonic response, U.S. Pat. No. 4,075,618 (Montean) discloses that a marker capable of generating very high order harmonics, thereby being operative in a system such as described in the '449 patent, may be made by adding flux collectors to a short strip of high permeability material which is insufficiently long to meet the definition of an "open-strip". That patent also suggests that a dual status flux collector type marker may be made by adding at least one piece of remanently magnetizable material adjacent to the material in the center section of the marker (i.e., between the flux collectors), which when magnetized biases the center section and alters the harmonic content of the signal produced by the center section.

Additional, non-elongated, dual status, flux collector type markers are disclosed in patent applications of Samuel Montean, U.S. Ser. No. 909,340 filed Sept. 19, 1986, now U.S. Pat. No. 4,710,754 and U.S. Ser. No. 909,467 filed Sept. 19, 1986 now abandoned, which are assigned to the same assignee as that of the present invention. All such disclosures propose only that keeper elements be provided adjacent to a center switching section of low coercive force responder material.

Typical EAS systems designed for use with the magnetic marker described above, are the Model WH-1000 and 1200 systems, marketed by Minnesota Mining and Manufacturing Company. Such systems typically produce within interrogation zones magnetic fields alternating at 10 kHz, and having minimum intensities at the center of the zone of approximately 1.2 oersteds (Oe), when fields generated in coils on opposite sides of the zone are in an opposing configuration, and of approximately 2.4 Oe when in an aiding configuration. The receiver portions of such systems process signals from receiver coils positioned within panels adjacent to the interrogation zone, and activate an alarm circuit in the event signals corresponding to very high order harmonics of the applied field are detected.

To compare the performance of various markers, it is convenient to use a test apparatus which generates fields alternating at a predetermined frequency and has controllable strength comparable to those encountered in such EAS systems. The test apparatus should detect signals in accordance with the harmonic characteristics relied upon in such systems and provide sensitivity values, based on a standard marker to ensure valid comparative results.

Such a test apparatus is preferably constructed to allow a marker to be inserted parallel with the field of the test apparatus and the gain adjusted to indicate a standardized sensitivity value.

SUMMARY OF THE INVENTION

Like the flux collector markers of the prior art as described above, the dual status marker of the present invention comprises at least one piece of low coercive force, high permeability responder material configured to have at least one center section and flux collectors proximate to each end of each center section. However, in contrast to the prior art markers in which magnetizable keeper elements are positioned to bias the center switching sections of the responder material, the marker of the present invention is made dual status by positioning pieces of remanently magnetizable keeper material proximate to at least certain of the flux collectors.

In a preferred embodiment, the marker of the present invention comprises a sheet-like piece of responder material, such as a square or rectangle, configured to exhibit at least two center sections extending in substantially different directions and having at least one common flux collector. Such a construction thus provides a response when the marker is oriented in either of two directions with respect to an applied field in an interrogation zone. In such an embodiment, the marker further comprises pieces of sheet-like keeper material which overlie at least certain flux collector portions of the sheet-like piece of responder material. As the center or switching sections in the responder portion are desirably quite short, relative to the overall dimensions of that piece, such sections will be unable to produce even a marginal response when the benefit of the flux collectors is inhibited by magnetizing the keeper elements positioned thereover. In such an embodiment, the marker may be deactivated by applying a non-alternating, magnetizing field to the marker regardless of its orientation, as magnetization of the keeper elements in any direction has been found to be effective to prevent switching of the adjacent flux collector, thus inhibiting its operation.

Furthermore, in a preferred embodiment, the configurations of sheet-like pieces of the responder material and of the keeper material are desirably obtained by etching desired patterns in thin metal sheets or foils. Leaving only the small area switching sections un-keepered results in less material needing to be removed during the etching process. It has been found that the signals produced by markers of the present invention, while containing very high order harmonics upon which detection can be reliably based, also contain various other isolatable characteristics making the markers useful in other systems in which harmonics per se may not be isolated.

DETAILED DESCRIPTION

Figure 1:
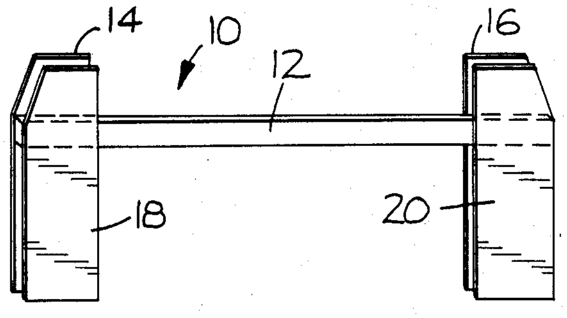
FIG. 1 is a perspective view of one embodiment of a marker of the present invention.

In one embodiment, as generally shown in FIG. 1, the marker 10 comprises an elongated strip 12 of a high permeability, low coercive force responder material having affixed to each end thereof so as to be magnetically coupled thereto flux collector pieces 14 and 16. Such a marker, without additional elements is, for example, depicted in FIG. 7 of the aforementioned U.S. Pat. No. 4,075,618. It is also shown in the '618 patent that such flux collector type tags may be made dual status by including at least one additional ferromagnetic material such as vicalloy, a magnetic alloy consisting of 52% Co, 10% V and 38% Fe, next to the elongated strip. Such a configured marker is desirably used with prerecorded audio cassettes, in which instance, the elongated strip 12 will preferably be a strip of permalloy approximately 3.5 inches long, 0.15 inch wide, and 0.001 inch thick.

Such a marker was converted into a dual status marker according to the present invention, by adding ½ inch by 1½ inch keeper elements 18 and 20 of type 301 magnetic stainless steel on top of the respective flux collector elements 14 and 16 as particularly shown in FIG. 1. When the keeper elements 18 and 20 were magnetized, the marker behaved as though the flux collectors 14 and 16 were no longer present. It will thus be recognized that a keepered flux collector marker which includes a substantially elongated strip does exhibit a different response, depending upon the magnetization state of the keeper elements. Such a difference may be sufficient for systems particularly designed to exploit the difference, but may be insufficient for more critical applications, or for preexisting systems.

A more preferred embodiment of the present invention results when the responding portion of the marker has a much shorter, i.e., non-elongated, center switching section. A two-dimensional version of such an embodiment is set forth in FIG. 2. In this embodiment, a responder portion 24 substantially as shown in FIGS. 5–8 of the aforementioned '754 patent is utilized. Thus, such a responder portion 24 is desirably formed of a single sheet 26 of a high permeability, low coercive force material, such as a 0.0006 inch thick sheet of permalloy. The sheet is configured with a central hole 28 and four switching sections 30, 32, 34 and 36, the widths of which are defined by smaller holes formed halfway along the respective four sides of the piece 26. The respective corner regions 38, 40, 42 and 44 form flux collectors for each of the adjacent switching sections 30 through 36. Such a marker is preferably formed by printing onto the permalloy sheet an acid resist pattern having the desired configuration, and subsequently etching away the undesired portions to result in the configuration shown in FIG. 2. Such an etching technique is particularly desirable when materials such as permalloy are used for the responder material, as mechanical working, which may degrade the response of the marker, and may result during otherwise required cutting or punching operations, is thereby avoided.

Figure 2:
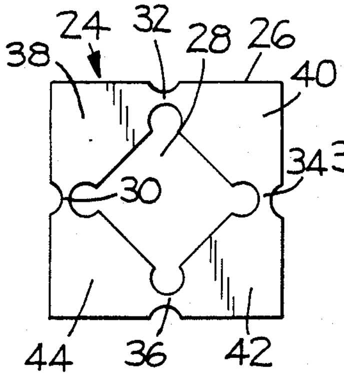
FIG. 2 is a top view of the responder portion of a two dimensionally responsive marker of the present invention.
Figure 3A:
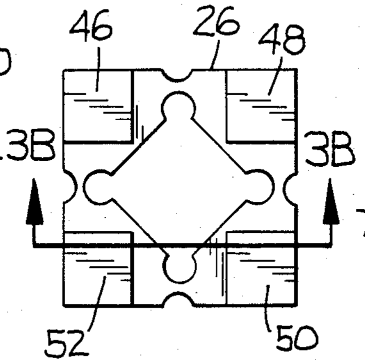
FIG. 3A is a top view of the marker partially shown in FIG. 2, in which keeper elements are also present.

A single status, multidirectional responder portion having orthogonally positioned switching sections such as shown in FIG. 2, may be preferably made into a dual status marker as shown in FIG. 3A, by the addition of square pieces 46, 48, 50 and 52 of a remanently magnetizable material positioned over each of the corners 38, 40, 42 and 44 respectively of the piece of responder material. Such pieces of remanently magnetizable material may be conveniently selected of a number of known remanently magnetizable materials such as type 301 stainless steel, vicalloy, Crovac, and like alloys. Such pieces may be conveniently adhered to an underlying layer of responder material by means of a thin adhesive such as a 0.001 to 0.003 inch thick layer of transfer adhesive. Such a construction is shown in the cross-sectional view of 3B wherein the transfer adhesive has not been shown.

Figure 3B:
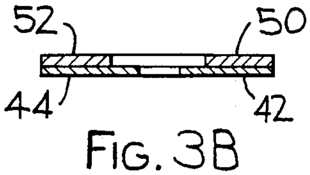
FIG. 3B is a cross-sectional view of the marker of FIG. 3A, taken along the lines 3B—3B.

Markers as shown in FIGS. 3A and 3B, constructed from a one inch square piece of permalloy in which the configuration of switching sections was formed by etching, were found to exhibit sensitivity values substantially the same as single status markers having the same configuration when measured in a sensitized condition in the aforedescribed test apparatus at a field intensity of 2.0 oersteds. To ensure that a response is not produced in the most intense fields to which such markers may be exposed in a typical interrogation zone, a test field intensity of 10 oersteds is desirably used when testing markers in a desensitized condition. At such an intensity, sensitized markers were found to typically exhibit sensitivity values of about 2.2.

Thus, when a marker as shown in FIG. 3A was formed by adhering approximately 7/16th inch squares of type 301 stainless steel pieces 46, 48, 50 and 52 to each of the respective corners of a one inch square configured piece of permalloy, the marker was found to exhibit a similar sensitized value when measured in a 10 oersted field. When the stainless steel sections were uniformly magnetized in what was determined to be a worst case condition, the sensitivity in such a field was observed to be about 0.1. At such field intensities, to reliably prevent detection, a desensitized marker should never exhibit a sensitivity value of greater than about 0.8.

Such stainless steel material is anisotropic and exhibits different magnetic properties in the down web direction than that exhibited cross web. Accordingly, variable results may be observed depending upon the orientation of the stainless steel pieces and further depending upon the orientation of the magnetizing field with respect to such keeper elements.

In a further series of markers, the effect of reducing the dimensions of four square pieces placed at each of the corners of such a square marker was evaluated.

Thus, for example, when the dimension of each of the four pieces was reduced to approximately 3/16th of an inch square, each piece still being a 0.002 inch thick piece of type 301 stainless steel, sensitivity values of approximately 0.3 were observed when the stainless steel pieces were magnetized.

Figure 4:
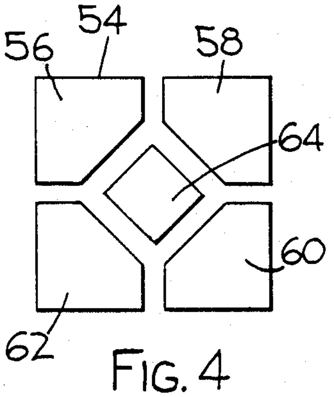

A further preferred pattern of keeper sections which minimizes the amount of material that must be removed from an otherwise contiguous sheet of keeper material is set forth in FIG. 4. As there shown, a sheet 54 of keeper material may be appropriately configured, such as by applying a corresponding pattern of acid resist to the sheet, followed by acid etching so as to result in the pattern in which pieces 56, 58, 60 and 62 are located at the corners and a further section 64 is located at the center. Each of the respective pieces are separated from each other to prevent magnetic coupling therebetween.

Markers formed from such a pattern of type 301 stainless steel and adhered to a patterned piece of permalloy as shown in FIG. 2, were found to exhibit particularly desirable characteristics. The configured pieces of permalloy were one inch square, 0.0006 inch thick pieces in which orthogonally located switching sections 0.030 inch wide were formed. Patterned, 0.002 inch thick pieces of type 301 stainless steel were adhered to the configured permalloy with 0.002 inch thick layer of transfer adhesive. Such markers, when fully sensitized, were found to exhibit a sensitivity of about 0.77 in a two oersted field and a sensitivity of about 2.5 in a ten oersted field. When the stainless steel pieces were thereafter magnetized cross web and down web, and when the marker was thereafter measured in a cross web and in a down web direction, the resultant sensitivity values were noted to be in the range of 0.05, thus showing that the marker could be completely desensitized regardless of the orientation of the magnetizing field with respect to the preferred direction of magnetization of the stainless steel and regardless of the alignment of the marker in the interrogating field.

The spacing between adjacent pieces of keeper material has also been found not to be overly critical, so long as a reasonable separation to inhibit magnetic coupling is present. Thus, for example, the space between the adjacent pieces of the above example was approximately 5/64th of an inch. When the spacing was increased to approximately ⅛th of an inch or decreased to approximately 3/64th of an inch, the desensitized value of the marker was found to be substantially the same.

Figure 5:
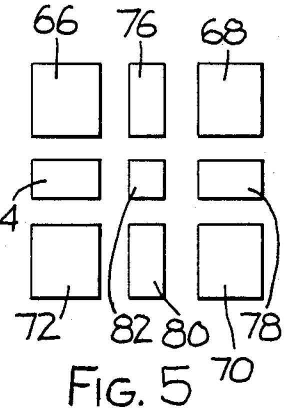
FIGS. 4–6 are top views of alternative embodiments of keeper elements of markers, adapted for use with a responder portion as shown in FIG. 2.

In a further embodiment showing an alternative configuration of keeper elements, a 0.002 inch thick type 301 sheet of stainless steel was configured as shown in FIG. 5 and thereafter adhered over a configured piece of permalloy as shown in FIG. 2. In an initial condition, only the square sections 66, 68, 70 and 72 were positioned over the corners of the patterned permalloy piece. When magnetized, the marker was found to exhibit a desensitized value in a 10 oersted field of approximately 0.1. When additional keeper pieces 74, 76, 78, and 80 were positioned over the dipole sections 30, 32, 34 and 36 of the permalloy and an additional piece 82 was placed in the center of the marker, the desensitized sensitivity values were found to be approximately one half that observed before. The additional pieces of keeper material thus both further reduce the desensitized sensitivity to ensure an altered response and add rigidity to the marker to inhibit bending about the narrow switching sections.

Figure 6:
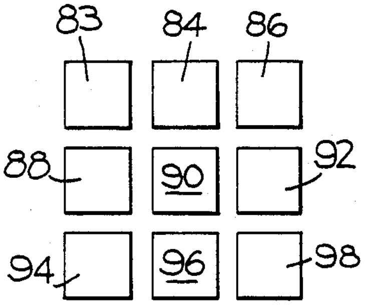

As shown in FIG. 6, a modification of such a construction may be provided, in which each of the keeper elements 83, 84, 86, 88, 90, 92, 94, 96 and 98 are the same size and are uniformly spaced from each other. When such pieces of type 301 stainless were thus formed and again adhered over a configured permalloy piece as shown in FIG. 2, desensitized values less than 0.05 were generally observed.

Figure 7A:
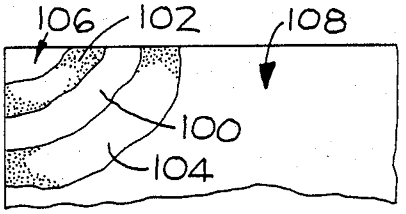
FIGS. 7A, 7B, 7C and 8 are top and perspective views showing a preferred construction of a marker, components of which have the configurations shown in FIGS. 2 and 4.
Figure 7B:
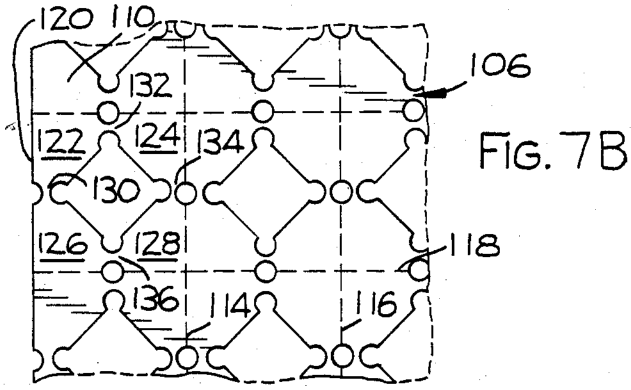
Figure 7C:
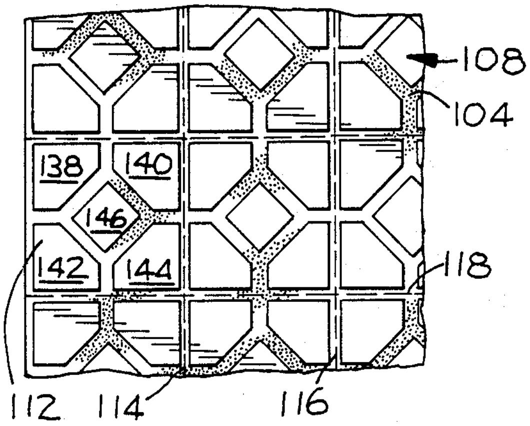

A preferred method of making a marker having responder and keeper portions as shown in FIGS. 2 and 4 is shown in FIGS. 7A, 7B and 7C. As shown in the cut away view of FIG. 7A, such a marker may be constructed from a laminate comprising a sandwich of a substrate 100 such as a sheet of polymeric material (preferably a 0.001 inch thick polyester), having on opposite surfaces thereof a layer of an adhesive 102 and 104. The adhesive layers may conveniently be a 0.002 inch thick layer of a transfer adhesive manufactured by Minnesota Mining and Manufacturing Company. Onto one of the adhesive layers such as the layer 102 may then be adhered a layer of an appropriate responder material 106, such as a 0.0006 inch thick sheet of permalloy, while to the opposite adhesive layer 104 may be adhered a sheet of appropriate keeper material, such as a 0.002 inch thick sheet of type 301 stainless steel.

Considering first the exposed surface of the sheet of responder material 106, that sheet may be coated with an acid resist layer 110, leaving uncoated by the resist areas of responder material which are desirably removed to create the configuration shown in FIG. 7B. In like manner, and in registry with the pattern in the resist material 110, the exposed surface of the sheet of keeper material 108 may be coated with a pattern of acid resist material 112, leaving uncoated areas desirably removed to create the resultant pattern shown in FIG. 7C, in which portions of the adhesive layer 10 may be seen between the remaining pieces of keeper material. It will thus be understood that the dashed lines 114, 116, and 118 as commonly shown in both FIGS. 7B and 7C ultimately define the boundaries of adjacent markers. Thus within a given marker 120, the sheet of responder material 106 is characterized by four corner areas 122, 124, 126 and 128, each of which respectively functions as a flux collector for switching sections 130, 132, 134 and 136 positioned therebetween. Correspondingly, the sheet of keeper material 108 is patterned so that after etching, five keeper sections 138, 140, 142, 144 and 146 remain, with the pieces 138 through 144 being located opposite one of the flux collecting portions 122, 124, 126 and 128.

The laminates with the patterned resist coatings on the metal layers 106 and 108 are next appropriately processed to remove the portions of the respective metal sheets that are non covered by the resist, such as by a conventional acid etching treatment which etches away the exposed metal surfaces from each of the respective layers, leaving there behind the portions of the metal layers covered by the resist material. Thus, for example, where the sheet of responder material 106 may be a 0.0006 inch thick layer of permalloy and the sheet of keeper material 108 may be a 0.002 inch thick layer of magnetic stainless steel type 301, each respective sheet may require different etching durations to remove the exposed metal. Thus, for example, if a single etching bath is used, the combined laminate layers may be first exposed for a period sufficient to remove the thinner permalloy. The laminate may then be removed from the etching bath and the permalloy covered to protect that layer from further etching. The laminate may then be reinserted into the etching bath and etching continued until the undesired portions of the stainless steel sheet are removed. Upon completion of the etching operations, the protective photoresist material may be washed away utilizing conventional resist techniques.

Figure 8:
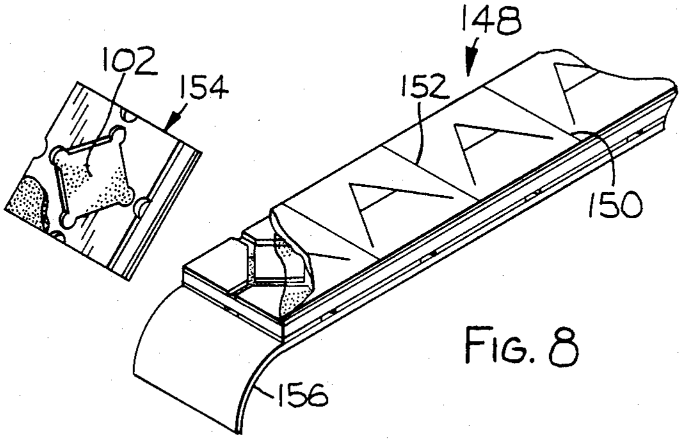

The resulting patterned laminate may then be formed into final markers by adhering a layer of printable paper over the stainless steel pieces to form a top most surface, and by adding a layer of transfer adhesive and release liner to the exposed side of the permalloy sheet. As shown in FIG. 8, such an ultimate construction may then be slit down web through the entire laminate to form a tape 148, in which a partial cut is provided along the lines 150 and 152 etc., thus allowing each successive marker 154 to be peeled away from the release liner. The exposed underlying transfer adhesive thus allows the markers to be adhered to objects to be protected.

While the markers described hereinabove, with regard to the preferred embodiments of the present invention are desirably made of crystalline responder material such as permalloy, supermalloy or the like, it is also within the scope of the present invention that a variety of high permeability, low coercive force materials may be used. Thus, for example, a number of amorphous alloys, both iron and cobalt based may be utilized. The selection of the given material to be preferred may depend upon the applications in which specific markers are intended to be used. Thus, for example, markers formed of amorphous alloys may be preferred where the marker is intended to be used in applications where flexing or stressing of the marker may adversely affect the response of markers containing crystalline alloys, as amorphous alloys are generally more immune to such effects. Similarly, the material used as the keeper elements may be formed of a variety of permanently magnetizable yet relatively low coercive force materials. While type 301 stainless steel has been described hereinabove as a preferred material, similar sheets of vicalloy and the like may also be utilized.

We claim:

1. A dual status marker for use in an electronic surveillance system in which there is produced in an interrogation zone an alternating magnetic field, said marker comprising at least one piece of low coercive force, high permeability responder material configured to have at least one center section and flux collectors proximate to each end of each said center section and pieces of remanently magnetizable keeper material positioned proximate to at least certain of said flux collectors, whereby when said pieces of keeper material are magnetized, localized fields result which bias the magnetization in said certain flux collectors and results in an altered response of the marker to said applied field compared to that resulting when said pieces of keeper material are unmagnetized.

2. A marker according to claim 1, wherein each said center section is an elongated strip and wherein flux collectors of a responder material are positioned proximate to each end of each strip.

3. A marker according to claim 1, wherein at least one piece of responder material extends in substantially two different directions to enable a response to magnetic fields in a said interrogation zone generally extending along either of said two different directions.

4. A marker according to claim 3, comprising a sheet-like piece of responder material configured to exhibit at least two center sections extending in substantially different directions and at least one common flux collector.

5. A marker according to claim 4, wherein pieces of sheet-like keeper material overlie at least certain flux collector portions of said sheet-like piece of responder material.

6. A marker according to claim 4, wherein each center section of said sheet-like piece of responder material comprises a region of restricted cross section defining a switching section within which flux may be concentrated by said proximate flux collectors.

7. A marker according to claim 4, wherein said sheet-like piece of responder material is substantially square, and exhibits said center sections extending in mutually orthogonal directions along each side of the piece, with said flux collectors being located generally in the corners of said piece.

8. A marker according to claim 7, wherein said square piece of responder material is configured with a central portion thereof removed from the interior, the narrowest regions between two adjacent outer edges of the piece and the outer edges of the removed portion defining two switching sections extending normal to each other.

9. A marker according to claim 8, wherein a piece of keeper material is positioned over each corner of the square piece of responder material.

10. A marker according to claim 9, further comprising additional sheet-like pieces of keeper material positioned over each said switching section, with all said pieces of keeper material being magnetically isolated from each other, said additional pieces of keeper material thereby adding rigidity to the marker to inhibit bending about the switching sections and when magnetized providing additional localized fields which bias the adjacent switching sections to further ensure an altered response.

11. A marker according to claim 10, wherein all said pieces of keeper material are substantially the same shape.

12. A marker according to claim 11, wherein all pieces of keeper material are substantially square, there being three pieces uniformly spaced along each side of the square piece of responder material.

13. A marker according to claim 1, wherein said keeper material comprises a remanently magnetizable metal alloy consisting of magnetic stainless steel, or vicalloy.

* * * * *